(12) United States Patent
Pannem et al.

(10) Patent No.: US 11,095,511 B2
(45) Date of Patent: Aug. 17, 2021

(54) VIRTUAL NETWORK OPERATIONS CENTER FOR CROSS-CLOUD HYBRID SERVICES UPGRADABILITY

(71) Applicant: VMware, Inc., Palo Alto, CA (US)

(72) Inventors: Hemanth Kumar Pannem, Cupertino, CA (US); Aarti Kumar Gupta, Mountain View, CA (US); Sachin Thakkar, San Jose, CA (US); Furkan Shaikh, Cupertino, CA (US); Kim Tran, Milpitas, CA (US); Lu Yu, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 171 days.

(21) Appl. No.: 16/048,021

(22) Filed: Jul. 27, 2018

(65) Prior Publication Data
US 2020/0036582 A1 Jan. 30, 2020

(51) Int. Cl.
*H04L 12/24* (2006.01)
*H04L 29/08* (2006.01)

(52) U.S. Cl.
CPC ........ *H04L 41/082* (2013.01); *H04L 41/0853* (2013.01); *H04L 41/0859* (2013.01); *H04L 67/10* (2013.01)

(58) Field of Classification Search
CPC .............. H04L 41/082; H04L 41/0853; H04L 41/0859; H04L 67/10
See application file for complete search history.

(56) References Cited

U.S. PATENT DOCUMENTS

| 9,348,652 | B2 | 5/2016 | Raghu |
| 9,866,464 | B1 | 1/2018 | Miltenberger |
| 2008/0168167 | A1* | 7/2008 | Calrson .................. H04L 67/125 709/224 |

(Continued)

OTHER PUBLICATIONS

Drew Robb, What is a NOC, and How It Improves Data Center Availability, May 5, 2017, http://www.datacenterknowledge.com/archives/2017/05/05/what-is-a-noc-and-how-it-improves-data-center-availability, 13 pages.

(Continued)

*Primary Examiner* — Nam T Tran
(74) *Attorney, Agent, or Firm* — Patterson + Sheridan, LLP

(57) ABSTRACT

Techniques are disclosed for cross-cloud hybrid services upgradability. In one embodiment, a virtual network operations center (NOC) with a centralized view of distributed, cross-cloud hybridity manager installations is responsible for continuously gathering information on the environments of on-premise and cloud computing systems, analyzing the gathered information to identify upgrades to hybridity manager instances that are compatible with dependent components and paired hybridity manager(s), and publishing notifications of compatible upgrades to the hybridity manager instances based on the analysis. The publishing of upgrade notifications by the virtual NOC is a server-initiated upgrade that is coordinated across hybrid cloud computing system sites, in contrast to traditional isolated client-initiated upgrades. In addition, the virtual NOC may revoke previous notifications if the associated upgrade versions are no longer compatible with the dependent components and/or the paired hybridity managers.

20 Claims, 6 Drawing Sheets

(56) References Cited

U.S. PATENT DOCUMENTS

| | | | |
|---|---|---|---|
| 2011/0252100 A1* | 10/2011 | Raciborski | H04L 67/10 709/206 |
| 2015/0046512 A1 | 2/2015 | Ashby et al. | |
| 2015/0180949 A1* | 6/2015 | Maes | H04L 67/10 709/201 |
| 2016/0117162 A1 | 4/2016 | Searle et al. | |
| 2016/0173486 A1 | 6/2016 | Abbott | |
| 2016/0301734 A1 | 10/2016 | Henderson et al. | |
| 2017/0041189 A1* | 2/2017 | Aswathanarayana | H04L 41/0843 |
| 2017/0060615 A1* | 3/2017 | Thakkar | H04L 67/10 |
| 2017/0155550 A1* | 6/2017 | Cooper | H04L 41/0859 |
| 2017/0279702 A1 | 9/2017 | Mah et al. | |
| 2018/0063074 A1* | 3/2018 | Shankarappa | H04L 67/10 |
| 2018/0307714 A1 | 10/2018 | Pignataro et al. | |
| 2018/0315055 A1 | 11/2018 | Pickover et al. | |
| 2019/0116178 A1 | 4/2019 | Coffey | |
| 2020/0036581 A1 | 1/2020 | Pannem et al. | |

OTHER PUBLICATIONS

Allwyn Sequeira, Vmware Hybrid Cloud Extension for VMware Cloud on AWS, Nov. 28, 2017, https://blog.cloud.vmware.com/s/content/a1y6A000000aFq8QAE/vmware-hybrid-cloud-extension-for-vmware-cloud-on-aws, 9 pages.

Julie Inlow Munoz et al., Vmware HCX on IBM Cloud (aka "space age IT")—now available!, Jan. 29, 2018, https://www.ibm.com/blogs/bluemix/2018/01/vmware-hcx-ibm-cloud-aka-really-cool-space-age-kind-now-available/, 8 pages.

Vmware Hybrid Cloud Extension, Making hybrid a reality: App mobility and infrastructure hybridity across any-to-anyvSphere cloud, https://ovhcloud.com/products/hosted-private-cloud/vmware-hcx#, 13 pages.

Vmware Hybrid Cloud Extension, App Mobility and Infrastructure Hybridity Across Any-to-Any vSphere, https://cloud.vmware.com/vmware-hcx, 7 pages.

Tran, H.M. et al., Fault Resolution System for Inter-Cloud Environment, Journal of Mobile Multimedia, 2014, vol. 10, Nos. 1 & 2, pp. 16-29.

Tran, Ha Manh et al., Software Bug Ontology Supporting Bug Search on Peer-to-Peer Networks, New Generation Computing, Jan. 15, 2013, pp. 1-19.

Tran, H.M. et al., DisCaRia-Distributed Case-Based Reasoning System for Fault Management, IEEE Transaction on Network and Service Management, Dec. 2015, vol. 12:4, pp. 540-553.

* cited by examiner

US 11,095,511 B2

VIRTUAL NETWORK OPERATIONS CENTER FOR CROSS-CLOUD HYBRID SERVICES UPGRADABILITY

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack® open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. However, the use of such public cloud services is typically kept separate from the use of existing computing resources in data centers managed by an enterprise.

With an increasing trend in migrating data centers to cloud platforms, a hybrid model has been developed that combines public cloud services and traditional on-premise data center computing resources. Such hybrid cloud computing systems permit workloads, such as virtual machines, to be rapidly moved from the data center to the cloud.

Users have a tendency to stick with older versions of software that work for their needs. However, such "stickiness" can become increasingly burdensome for developers who must support multiple versions of the software, especially across multiple sites such as the data centers of a hybrid cloud computing system. The distribution of hybrid cloud computing system components across multiple sites also requires a holistic view of the entire deployment topology to provide compatible updates across those sites. However, in client-initiated upgrades, a user of the hybrid cloud computing system may only have visibility into, e.g., on-premise data center components, rather than the entire deployment topology. In addition, there are no traditional mechanisms for continuous monitoring of hybrid cloud computing system components across sites to detect and prevent, or to correct, issues due to component version incompatibilities.

SUMMARY

One embodiment disclosed herein provides a computer-implemented method. The method generally includes collecting, from each hybridity manager of a plurality of hybridity managers that run in respective on-premise or cloud computing systems of a hybrid cloud computing system, information relating to a version of the hybridity manager and versions of dependent components associated with the hybridity manager. The method further includes determining a compatible upgrade for one of the plurality of hybridity managers based, at least in part, on a portion of the collected information. In addition, the method includes publishing a notification indicating the compatible upgrade to the one of the plurality of hybridity managers.

Further embodiments include computer systems configured to carry out the above methods, and non-transitory computer-readable storage media comprising instructions that cause the computer systems to carry out the above methods.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments disclosed herein provide techniques for cross-cloud hybrid services upgradability. In one embodiment, a virtual network operations center (NOC) with a centralized view of distributed, cross-cloud hybridity manager installations is responsible for continuously gathering information on the environments of on-premise and cloud computing systems, analyzing the gathered information to identify upgrades to hybridity manager instances that are compatible with dependent components and paired hybridity manager(s), and publishing notifications of compatible upgrades to the hybridity manager instances based on the analysis. As used herein, a "hybridity manager" refers to an application running in either an on-premise computing system controlled and administrated by a particular enterprise or business organization, or in a cloud computing system operated by a cloud computing service provider and exposed as a service, with the hybridity manager being configured to manage computing resources provided by the virtualized or cloud computing system and, together with hybridity manager(s) running in remote (cloud or virtualized computing system) site(s), integrate the computing resources across those site(s) to form a unified "hybrid" computing platform. The publishing of upgrade notifications by the virtual NOC is a server-initiated upgrade that is coordinated across hybrid cloud computing system sites, in contrast to the traditional isolated client-initiated upgrades. In addition, the virtual NOC may revoke previous notifications if the associated upgrade versions are no longer compatible with the dependent components and/or the paired hybridity managers.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
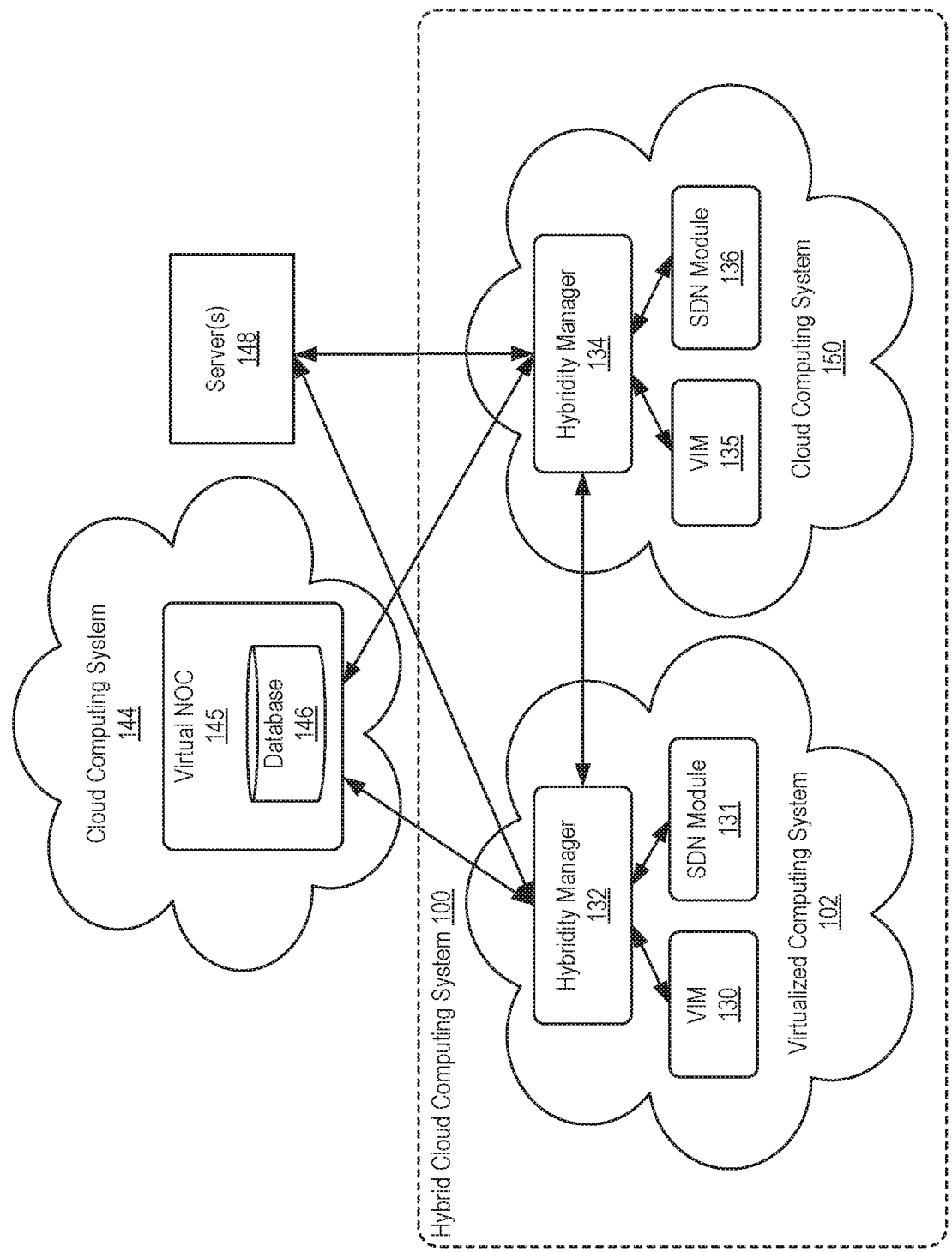
FIG. 1 illustrates an approach for enabling cross-cloud hybrid services upgradability, according to an embodiment.

FIG. 1 illustrates an approach for enabling cross-cloud hybrid services upgradability, according to an embodiment.

As shown, a hybrid cloud computing system 100 includes a virtualized computing system 102 and a cloud computing system 150. As described, virtualized computing system 102 may be a data center controlled and administrated by a particular enterprise or business organization, while cloud computing system 150 may be operated by a cloud computing service provider and exposed as a service available to account holders, such as the particular enterprise in addition to other enterprises. In such a case, virtualized computing system 102 may be referred to as an "on-premise" data center, and cloud computing system 150 may be referred to as a "public" cloud service. As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In a hybrid cloud, a tenant may be provided with seamless access to one or more private cloud resources and/or public cloud resources.

Although virtualized and cloud computing systems 102 and 150 are shown for illustratively purposes, it should be understood that an on-premise virtualized computing system may be paired with any number of cloud computing systems, and vice versa, in a hybrid cloud computing system. The pairing(s) may result in, e.g., a mesh environment in which multiple virtualized computing systems are paired with multiple cloud computing systems or a spoke environment in which one virtualized computing system is paired with multiple cloud computing systems, or vice versa.

As shown, hybridity managers 132 and 134 run in virtualized and cloud computing systems 102 and 150, respectively. Hybridity managers 132 and 134 are configured to manage and integrate virtualized computing resources provided by virtualized and cloud computing systems 102 and 150 in order to form a unified "hybrid" computing platform. In a particular embodiment, hybridity managers 132 and 134 may be Enterprise and Cloud components, respectively, of the Hybrid Cloud Extension (HCX) product that is commercially available from VMware, Inc. of Palo Alto, Calif. Hybridity managers 132 and 134 such as HCX Enterprise and Cloud may abstract the computing resources of virtualized and cloud computing systems 102 and 150, presenting such resources to applications as one continuous hybrid cloud. In addition, hybridity managers 132 and 134 may create high-performance, secured, and optimized interconnects between virtualized and cloud computing systems 102 and 150, as discussed in greater detail below, with the abstraction of the computing resources and the site interconnects providing infrastructure hybridity that enables application mobility and disaster recovery across virtualized and cloud computing systems 102 and 150.

As shown, hybridity manager 132 is in communication with a virtualization infrastructure manager (VIM) 130 and a software defined network (SDN) module 131, which are configured to manage infrastructure and network virtualization, respectively, in virtualized computing system 102. One example of a VIM is the vCenter Server® product made available from VMware, Inc. Examples of SDN modules include VMware NSX-V (NSX® for vSphere®) and NSX-T, which are also commercially available from VMware, Inc. As discussed in greater detail below, VIM 130 and SND module 131 are required by hybridity manager 132 in order to provide the hybrid cloud computing platform. Such required applications are also referred to herein as "dependent components," and each dependent component in virtualized computing system 102 registers with hybridity manager 132. Likewise, hybridity manager 134 is in communication with dependent components in cloud computing system 150, shown as a VIM 135 and a SDN module 136, and each such dependent component registers with hybridity manager 134.

A virtual NOC 145, which runs in another cloud computing system 144 (but may also run elsewhere), is configured to act as a centralized management control center that oversees hybridity manager instances (e.g., hybridity managers 132 and 134) running in on-premise and cloud computing systems (e.g., virtualized and cloud computing systems 102 and 150). Virtual NOC 145 may be implemented as a software as a service (SaaS) that is deployed in cloud computing system 144. In particular, virtual NOC 145, as well as hybridity managers 132 and 134, may be implemented using a micro services-based architecture in one embodiment. In such a case, each feature of virtual NOC 145 may be a service that can be enabled or disabled through configuration, and hybridity managers 132 and 134 may share the same base code as virtual NOC 145 but have different services enabled. That is, the micro-services architecture allows the application to take polymorphic avatars depending on where the application is deployed, as either an on-premise hybridity manager (e.g., hybridity manager 132), a cloud hybridity manager (e.g., hybridity manager 134), or as a virtual NOC (e.g., virtual NOC 145). Further, virtual NOC 145 may in one embodiment provide various services, including activation, publisher, telemetry, and observability services, to hybrid cloud components such as hybridity manager instances, as discussed in greater detail below.

As shown, virtual NOC 145 is in communication with both of hybridity managers 132 and 134. In one embodiment, virtual NOC 145 collects information from hybridity managers 132 and 134 relating to the virtualized computing system 102 and cloud computing system 150 environments, including the versions of hybridity managers 132 and 134 and dependent components. Subsequent to collecting such information from hybridity managers 132 and 134, virtual NOC 145 determines whether a compatible upgrade to hybridity manager 132 and/or hybridity manager 134 is available, in which case virtual NOC 145 publishes an upgrade notification to each of the hybridity managers 132 and/or 134 for which a compatible upgrade is available. Virtual NOC 145 may perform version compatibility checks across sites of hybrid cloud computing system 100 to ensure that the upgrade to a hybridity manager in an on-premise or cloud computing system is compatible with (1) paired hybridity managers in cloud or on-premise computing systems, respectively, and (2) dependent components in the same on-premise or cloud computing system. Such compatibility checks help ensure that the upgrade will not break the hybridity plane by, e.g., making paired hybridity managers incompatible with each other, breaking the connectivity between paired hybridity managers, breaking networks that are stretched across virtualized and cloud computing systems 102 and 150, or the like. The complexity of upgrading is managed on the server side by virtual NOC 145 that has a holistic view of the virtual and cloud computing system 150 environments and pushes out notifications of compatible versions, which differs from client-initiated upgrades in which a user may have visibility into only one of the hybrid cloud computing system 100 sites. It should be understood that the compatible upgrade versions may include builds that fix security or compatibility bugs, and virtual NOC 145 pro-actively sends notifications of such upgrade versions.

In one embodiment, hybridity manager builds are registered with virtual NOC 145 and build binaries uploaded to web server(s), such as a content distribution network (CDN). A CDN may include a geographically distributed network of proxy servers and associated data centers. The registering of a hybridity manager build with virtual NOC 145 may include a user entering metadata such as the build version number and compatible versions of dependent components and paired hybridity managers, among other things, in a user interface (UI), such as a web page associated with virtual NOC 145, or uploading a manifest file including such metadata. That is, the compatibility matrix used by virtual NOC 145 to determine compatibility with paired hybridity managers and dependent components is specified during registration. Further, any suitable compatibility matrix may be specified, such as the minimum compatibility or equal compatibility versions of dependent components and paired hybridity managers.

After hybridity manager installations (e.g., hybridity managers 132 and 134) are registered with virtual NOC 145 and activated, virtual NOC 145 periodically gathers environment information from the registered hybridity managers, which may each invoke application programming interfaces (APIs) exposed by dependent components to collect their version information and then send the collected version information along with version information on the hybridity manager itself to virtual NOC 145. As described, virtual NOC 145 uses the periodically gathered environment information to perform version compatibility checks and determine whether there is a compatible version of a registered build that can be pushed to each of the registered hybridity managers as an upgrade. Further, hybridity managers running in multiple (e.g., all) sites of a hybrid cloud computing system may be upgraded at the same time.

Each hybridity manager 132 and/or 134 that receives an upgrade notification from virtual NOC 145 periodically raises an alert, such as a pop-up text box, via a UI, indicating to a user that the upgrade is available and should be downloaded. The user may then accept or decline the upgrade, or schedule the upgrade for a later time such as a maintenance period. Experience has shown that the rate of upgrade adoption improves when users are periodically annoyed with such alerts.

In one embodiment, virtual NOC 145 also revokes an upgrade notification when virtual NOC 145 determines that the upgraded hybridity manager version is no longer compatible with paired hybridity managers and/or dependent components. This assumes that the upgraded version has not already been installed. That is, virtual NOC 145 ensures that the out-of-band upgrade remains compatible; otherwise, virtual NOC 145 pushes a notification to the appropriate hybridity manager indicating that the upgrade is broken and should not be performed. For example, if one of the dependent components is upgraded first and becomes incompatible with the hybridity manager version specified in an upgrade notification, then virtual NOC 145 may revoke that upgrade notification after collecting environment information and identifying the incompatibility. In turn, the hybridity manager will stop raising alerts for the user to upgrade to that version of the hybridity manager.

Figure 2:
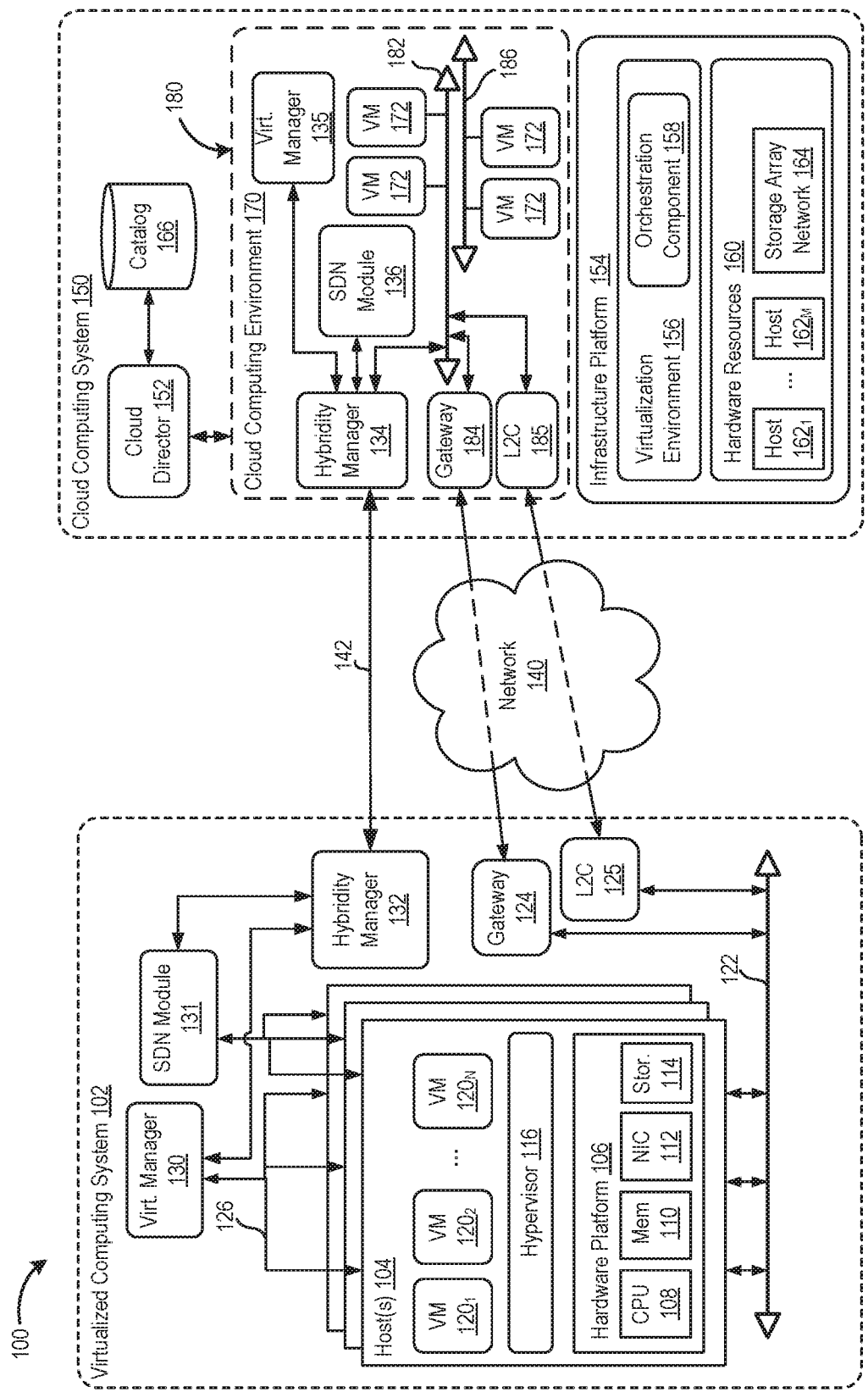
FIG. 2 illustrates in greater detail a hybrid cloud computing system, according to an embodiment.

FIG. 2 illustrates in greater detail hybrid cloud computing system 100, according to an embodiment. Although components of hybrid cloud computing system 100, which includes virtualized computing system 102 and cloud computing system 150, are shown for illustrative purposes, it should be understood that a hybrid cloud computing system may generally have any number of virtualized and cloud computing systems and the virtualized and cloud computing systems in other hybrid cloud computing systems may include similar components as the virtualized and cloud computing systems 102 and 150 of hybrid cloud computing system 100. As described, virtualized computing system 102 and cloud computing system 150 of hybrid cloud computing system 100 are configured to provide a common platform for managing and executing virtual workloads seamlessly between virtualized and cloud computing systems 102 and 150.

As shown, virtualized computing system 102 includes one or more host computer systems 104. Each of hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processors 108 are configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as networks 122 and 126 within virtualized computing system 102. Network interface 112 may include one or more network adapters, also referred to as network interface cards (NICs). Storage 214 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines 1101 to 120N (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere® solution made commercially available from VMware, Inc. Hypervisor 116 may run on top of the operating system of host 104 or directly on hardware components of host 104. In addition, hypervisor 116 may provide a virtual switch (not shown), which is a software-based switch acting as a layer 2 (L2) forwarding engine and capable of performing VLAN tagging, stripping, filtering, L2 security, checksum, segmentation offload units, and other tasks typically performed by physical switches. The virtual switch may include uplink ports which connect to physical network adapters, as well as VM ports which connect to virtual network adapters and provide connections for hypervisor 116 and VMs. In one embodiment, the virtual switch may be part of a distributed virtual switch that is an abstraction of a switch across multiple host servers and that permits virtual switches on the multiple host servers to be managed as if ports of those virtual switches belonged to a single switch, the distributed virtual switch.

Virtualized computing system 102 includes VIM 130 that may communicate with the plurality of hosts 104 via network 126, sometimes referred to as a management network. In one embodiment, VIM 130 is a computer program that resides and executes in a central server, which may reside in virtualized computing system 102, or alternatively, VIM 130 may run as a VM in one of hosts 104. One example of a VIM is the vCenter Server® product made available from VMware, Inc. VIM 130 is configured to carry out administrative tasks for virtualized computing system 102, including managing hosts 104, managing VMs 120 running within each host 104, provisioning VMs, migrating VMs from one host to another host, and load balancing between hosts 104.

Virtualized computing system 102 also includes SDN module 131, which is configured to manage infrastructure and network virtualization, respectively, in virtualized computing system 102. Software defined networking comprises a plurality of hosts in communication over a physical network infrastructure, each host having one or more virtual computing instances such as virtual machines VMs or containers that are connected to logical overlay networks that can span multiple hosts and are decoupled from the underlying physical network infrastructure. Logical networks may be enabled and managed in the virtual data center by a SDN module (e.g., a management plane and a central controller) such as SDN module 131 that runs on one or more hosts (e.g., as a distributed controller/management plane or a single controller/management plane running directly on the one or more hosts, within one or more VMs, etc.). Examples of SDN modules include VMware NSX-V (NSX® for vSphere®) and NSX-T, available from VMware, Inc.

As shown, virtualized computing system 102 further includes hybridity manager 132 that is in communication with VIM 130 and configured to manage and integrate virtualized computing resources provided by cloud computing system 150 with virtualized computing resources of computing system 102 to form a unified "hybrid" computing platform. In one embodiment, hybridity manager 132 is configured to deploy VMs in cloud computing system 150, transfer VMs from virtualized computing system 102 to cloud computing system 150, and perform other "cross-cloud" administrative tasks, as described in greater detail later. Although shown as a separate computer program, which may execute in a central server or run in a VM in one of hosts 104, hybridity manager 132 may alternatively be a module or plug-in complement to VIM 130.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 2, infrastructure platform 154 includes hardware resources 160 having computing resources (e.g., hosts 1621 to 162N), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as a multi-tenant cloud service with logically isolated virtualized computing resources on a shared physical infrastructure. It is recognized that cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and virtual machine packages that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 2, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual machine) is configured to provide VMs 172 and other components in cloud computing environment 170 with connectivity to an external network 140 (e.g., Internet). Gateway 184 manages external public IP addresses for virtual data center 180 and one or more private internal networks interconnecting VMs 172. Gateway 184 is a WAN facing device providing services such as intelligent routing, traffic steering, WAN optimization, encryption, etc. Gateway 184 may be configured to provide virtual private network (VPN) connectivity over a network 140 with another VPN endpoint, such as a gateway 124 within virtualized computing system 102. In other embodiments, gateway 184 may be configured to connect to and communicate with virtualized computing system 102 using a high-throughput, dedicated link between virtualized computing system 102 and cloud computing system 150. Layer 2 concentrators (L2C) 125 and 185 are parallel to gateways 124 and 184 and configured to provide a "stretched" L2 network that spans virtualized computing system 102 and cloud computing system 250. The stretched network may be separate from the network used by gateways 124 and 184 so that, e.g., VM migration traffic over network used by gateways 124 and 183 does not create latency in stretched network.

As shown, cloud computing system 150 includes hybridity manager 134 configured to communicate with the corresponding hybridity manager 132 in virtualized computing system 102 to enable a common virtualized computing platform between virtualized computing system 102 and cloud computing system 150. Hybridity manager 134 (e.g., executing as a virtual machine) may communicate with hybridity manager 132 using Internet-based traffic via a VPN tunnel established between gateways 124 and 184, or alternatively, using direct connect 142. In addition, hybridity manager 134 is in communication with VIM 135 and SDN module 136, which may perform similar functionalities as VIM 130 and SDN module 131, described above.

Figure 3:
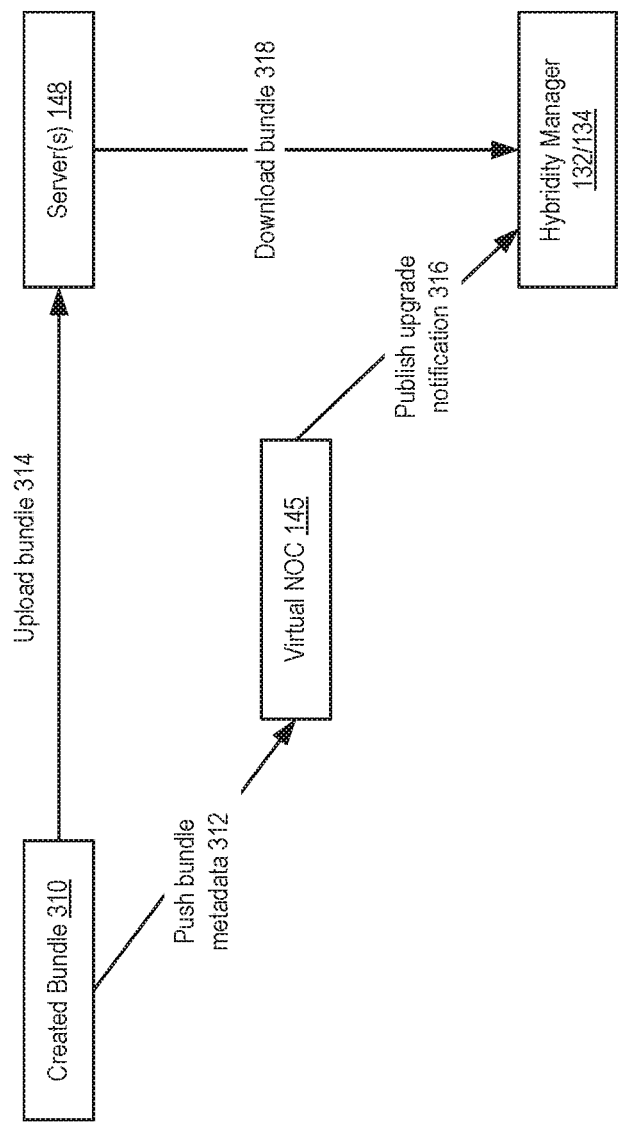
FIG. 3 illustrates upgrading a hybridity manager in a hybrid cloud system, according to an embodiment.

FIG. 3 illustrates an approach for upgrading hybridity manager 132 in hybrid cloud system 100, according to an embodiment. As shown, an upgrade bundle 310 containing the binary of a new build version of hybridity manager 132 is uploaded at 312 to web server(s), shown as a content distribution network 320. Although described with respect to an upgrade to hybridity manager 132 in virtualized computing system 102, it should be understood that a similar approach may be used to upgrade hybridity manager 134 if hybridity manager 132 were to be replaced by hybridity manager 134 in FIG. 3.

In addition to uploading of upgrade bundle 310 to content distribution network 320, a manifest associated with upgrade bundle 310 is pushed to virtual NOC 145 at 314. In one embodiment, the manifest is a file defining metadata for the new build version of hybridity manager 132 that is uploaded to content distribution network 320. In such a case, the metadata in the manifest may specify compatibility information, such as a compatibility matrix that includes compatible versions of dependent components and paired hybridity managers, and validated configuration data. That is, the compatibility matrix for a new hybridity manager build may be specified as part of the metadata during registration. In alternative embodiments, the metadata may be pushed to virtual NOC 145 without using a manifest file. For example, a user may enter and send the metadata information to virtual NOC 145 via a web page.

At 316, virtual NOC 145 utilizes compatibility information such as that specified in bundle manifest metadata, along with periodically gathered environment information on the versions of paired hybridity manager 134 and associated dependent components, to determine whether to publish a notification of the upgrade bundle 310 to hybridity manager 132. If an upgrade notification is published to hybridity manager 132, then hybridity manager 132 may periodically raise an alert in a UI to inform users of the upgrade and urge them to upgrade. In one embodiment, the UI may provide a single console that permits users to see all the paired sites in hybrid cloud computing system 100 as well as the upgrade builds for each of those sites.

Figure 4:
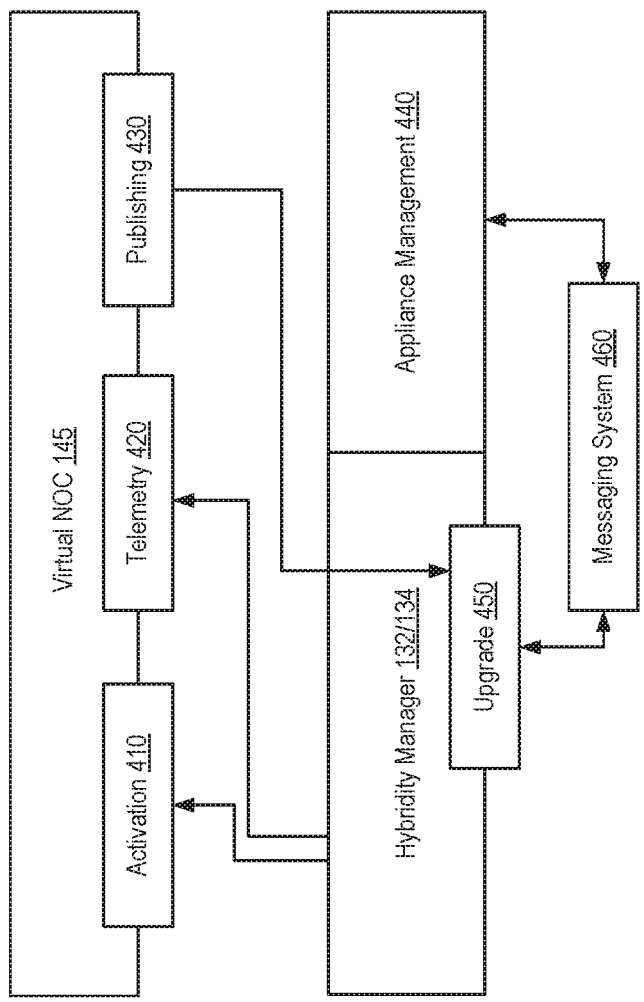
FIG. 4 illustrates services provided by a virtual network operations center, according to an embodiment.

FIG. 4 illustrates services provided by virtual NOC 145, according to an embodiment. As shown, virtual NOC 145 provides an activation service 410, a telemetry service 420, and a publishing service 430. Hybridity managers (e.g., hybridity managers 132 and 134) may register themselves with activation service 310 prior to use. Such registration may include, e.g., entering a product key and activates the installation so that the hybridity manager instance can be used. In addition, pairings of on-premise hybridity managers (e.g., hybridity manager 132) and cloud hybridity managers (e.g., hybridity manager 134) may be specified with activation service 310. As described, paired hybridity managers may integrate virtualized computing resources provided by their virtualized and cloud computing systems to form a unified hybrid computing platform. In one embodiment, a communication channel is also established between each pairing of hybridity managers in the virtualized and cloud computing systems after the pair is registered with virtual NOC 145.

Telemetry service 420 is configured to periodically collect information relating to the environments of virtualized and cloud computing system 102 and 150. Such environment information may include the build versions of hybridity managers; cloud infrastructure information such as the build versions of dependent components; the build versions of interconnected components; service level debugging/trend information such as the number of jobs that are succeeding, failing, and suspended; system information such as the threads in use, memory usage, CPU usage, storage usage, job count, and so on. In one embodiment, hybridity managers (e.g., hybridity managers 132 and 134) invoke APIs exposed by their dependent components to collect environment information from those dependent components, and hybridity managers 132 and 134 then utilize the job framework described above to spawn jobs in virtual NOC 145 that store the collected environment information and environment information provided by the hybridity managers 132 and 134 themselves in, e.g., a database.

Publishing service 430 is configured to determine compatible upgrades to hybridity managers and publish notifications of the same to those hybridity managers. Although described herein for simplicity with respect to actions performed by virtual NOC 145 to determine and publish upgrade notifications, it should be understood that such actions are actually performed by publishing service 430 in particular in one embodiment. That is, the upgrades to hybridity managers are server-initiated upgrades that publishing service 430 in particular initiates.

Illustratively, an upgrade notification receiving service 450 in hybridity manager 132 or 134 is configured to receive notifications published by publishing service 430 and push such notifications to a messaging system 460 where the notifications are queued. In one embodiment, messaging system 460 is used to support the remote job framework discussed above. In a particular embodiment, messaging system 460 may be the Apache Kafka platform. An appliance management process 440 running at a root level, which is a higher permission level than the rest of hybridity manager 132 or 134, then receives the notifications from the messaging system 460 queue and performs the actual upgrade, which may include, e.g., pulling the build binary from server(s) 148, replacing the appropriate binaries, making configuration changes, upgrading a database, and/or rebooting. As described, the upgrade is only performed after the user accepts the upgrade (or at a scheduled later time), and in one embodiment the messaging system 460 event may be a trigger sent to appliance management process 440 to ensure the upgrade triggers with the proper user context. It should be understood that the appliance management process 440 may also perform functionalities not related to upgrading, such as the initial bootstrapping of hybridity manager 132 or 134 and maintenance-related activities.

Figure 5:
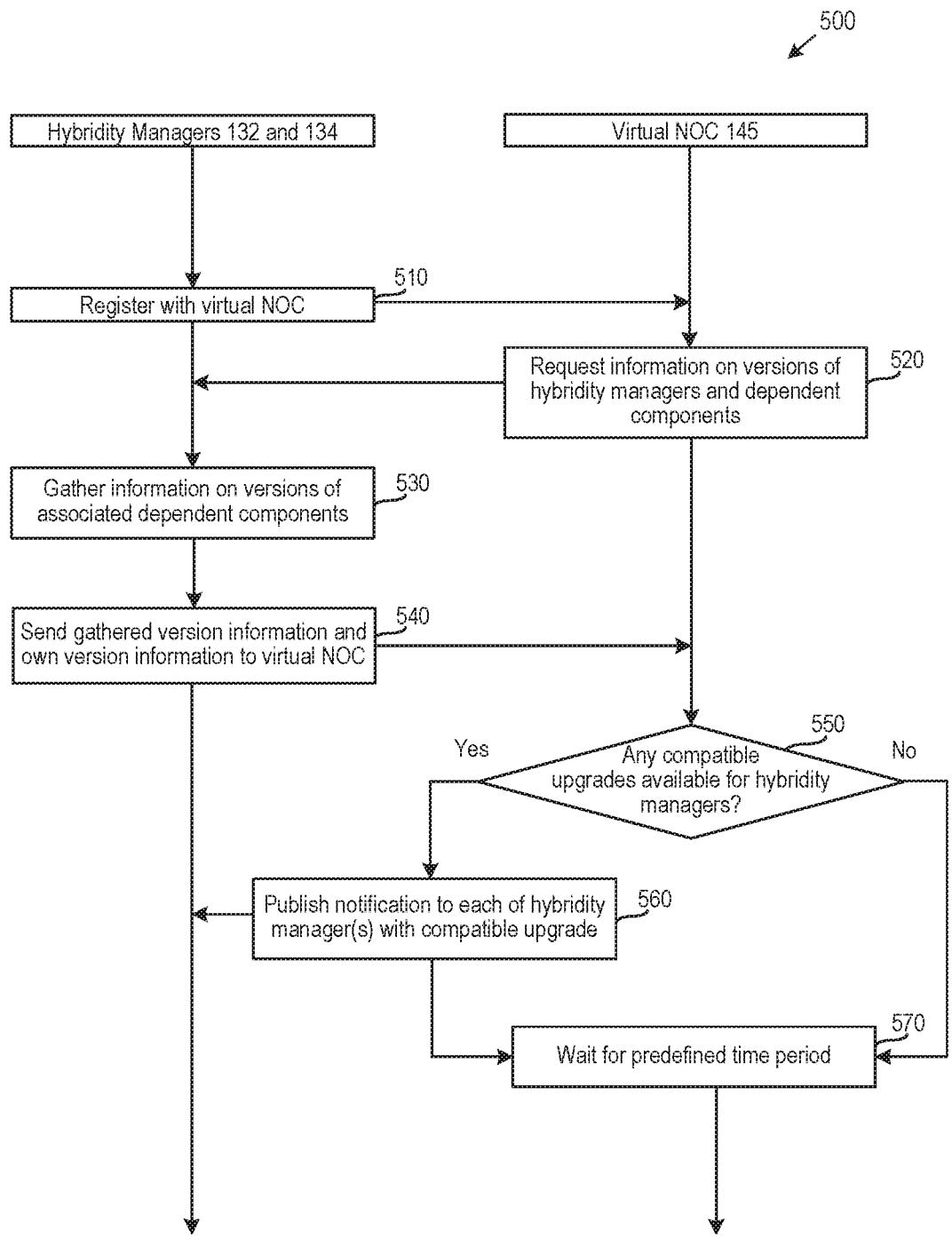
FIG. 5 illustrates a method for publishing upgrade notifications in a hybrid cloud system, according to an embodiment.

FIG. 5 illustrates a method 500 for publishing upgrade notifications in a hybrid cloud system, according to an embodiment. As shown, method 500 begins at step 510, where hybridity managers 132 and 134 in virtualized computing system 102 and cloud computing system 150, respectively, register with virtual NOC 145. Although discussed for simplicity with respect to two hybridity managers 132 and 134 in one hybrid cloud 100, it should be understood that, more generally, any number of hybridity managers in any number of hybrid clouds may register with virtual NOC 145. As described, the registration process may include, e.g., entering a product key that activates the installation, and pairings of hybridity managers may also be specified during registration.

At steps 520, virtual NOC 145 requests, from the registered hybridity managers 132 and 134, information on versions of the hybridity managers 132 and 134 and associated dependent components. In one embodiment, a continuous and asynchronous telemetry process may be responsible for gathering such version information, with the version information being gathered from multiple hybrid cloud computing system sites simultaneously and sent to telemetry service 420, discussed above with respect to FIG. 4. In such a case, the actual work of gathering and sending the version work is performed by the lower level hybridity managers 132 and 134, while telemetry service 420 in virtual NOC 145 may just be a receiver bookkeeping process.

At step 530, each hybridity manager 132 and 134 collects information on versions of its associated dependent components by, e.g., invoking APIs exposed by those dependent components. As described, hybridity managers 132 and 134 may continuously collect and store such version information, which are then periodically sent to virtual NOC 145. Further, hybridity managers may collect version information from dependent components simultaneously.

Then, at step 540, hybridity managers 132 and 134 send the version information gathered at step 530 and their own version information to virtual NOC 145. Any suitable communication mechanism may be used to send the gathered version information. In one embodiment, a remote job framework may be utilized by hybridity managers 132 and 134 to push the version information to virtual NOC 145 by spawning a job in virtual NOC 145 that takes the version information and stores that information in a database of virtual NOC 145. Details of a remote job framework are disclosed in U.S. patent application Ser. No. 14/839,180 entitled Hybrid Task Framework and filed on Aug. 28, 2015, which is incorporated by reference herein in its entirety.

At step 550, virtual NOC 145 determines whether there are any compatible upgrades available for hybridity managers 132 or 134. As described, new hybridity manager builds may be registered with virtual NOC 145 and their binaries uploaded to server(s) such as a CDN. Further, the registering process may include providing metadata (e.g., via a web page) that specifies a compatibility matrix. In turn, virtual NOC 145 uses such a compatibility matrix, along with the environment information received at step 540, to determine compatible upgrade builds for hybridity managers 132 and 134. In particular, the compatibility check may include ensuring that the upgrade build to a hybridity manager in an on-premise or cloud computing system is compatible with (1) paired hybridity managers in cloud or on-premise computing systems, respectively, and (2) dependent components in the same on-premise or cloud computing system, based on the compatibility information specified in the compatibility matrix.

In an alternative embodiment, virtual NOC 145 may display the version information received at step 540 and the compatibility matrix information via a UI. Then, a user may manually select compatible upgrade builds and specify where to publish those builds.

If there are compatible upgrades for either hybridity manager 132 or 134, then at step 560, virtual NOC 145 publishes notifications indicating the same to those hybridity manager(s). As discussed in greater detail below with respect to FIG. 6, a hybridity manager (e.g., one of hybridity managers 132 or 134) that receives such a notification may periodically raise alerts about the upgrade in a UI, and then download and install the build binary, either immediately or at a scheduled time, after a user accepts the upgrade via the UI. In addition to publishing upgrade notifications, virtual NOC 145 may perform bookkeeping in one embodiment to identify and record trends such as the number of times upgrade notifications for a build were published, the percentage of users who ultimately upgraded, and the like.

At step 550, virtual NOC 145 waits for a predefined period of time. As described, virtual NOC 145 periodically gathers information from hybridity managers 132 and 134. After the waiting at step 550, virtual NOC 145 may again collect, from hybridity managers 132 and 134, information on the versions of hybridity managers 132 and 134 and associated dependent components, similar to steps 520-540 described above.

In addition to the steps of method 500 for publishing upgrade notifications, virtual NOC 145 may also revoke upgrade notifications when virtual NOC 145 determines that the upgraded hybridity manager versions are no longer compatible with paired hybridity managers and/or dependent components, as described above. That is, virtual NOC 145 ensures that the out-of-band upgrade remains compatible prior to the upgrade being performed, and, if the upgrade is no longer compatible, then virtual NOC 145 pushes a notification to the appropriate hybridity manager indicating that the upgrade is broken and should not be performed.

Figure 6:
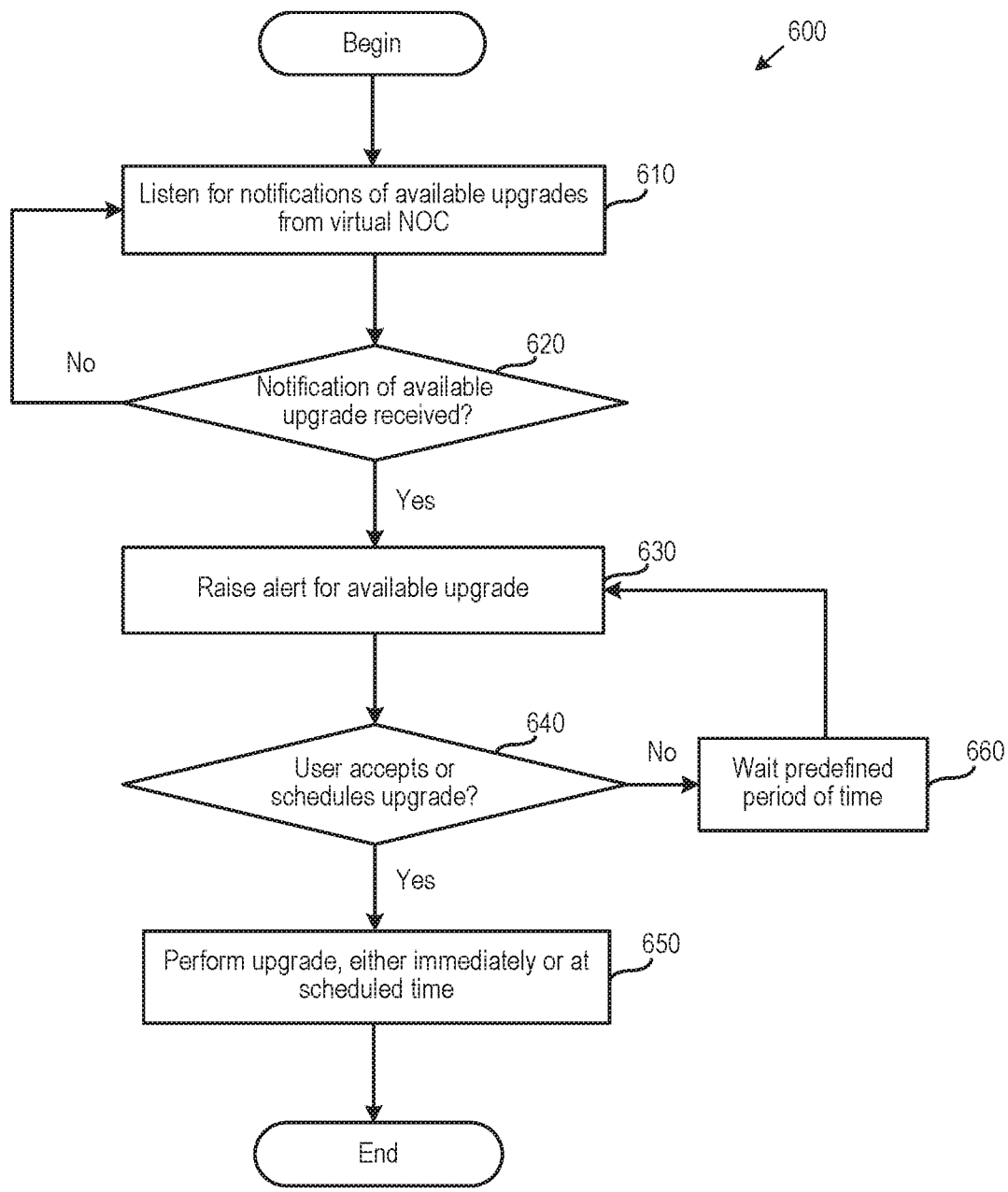
FIG. 6 illustrates a method for upgrading a hybridity manager in response to an upgrade notification, according to an embodiment.

FIG. 6 illustrates a method 600 for upgrading a hybridity manager in response to an upgrade notification, according to an embodiment. As shown, method 600 begins at step 610, where hybridity manager 132 or 134 listens for notifications of available upgrades from virtual NOC 145. A method 500 by which virtual NOC 145 may determine compatible upgrades and publish notifications indicating the same is described above with respect to FIG. 5.

If a notification of an available upgrade is received at 620, then method 600 continues to step 630, where hybridity manager 132 or 134 raises an alert for the available upgrade. As described, hybridity manager 132 or 134 may periodically raise an alert, such as a pop-up text box in a UI associated with hybridity manager 132 or 134, indicating to a user that the upgrade is available and should be downloaded. In one embodiment, the alert may permit the user to accept the upgrade, decline the upgrade, or schedule the upgrade for a later time such as a maintenance period.

If the user accepts the upgrade or schedules the upgrade at step 640, then method 600 continues to step 650, where hybridity manager 132 or 134 performs the upgrade, either immediately or at the scheduled time. As described, the upgrade may be performed by appliance management process 440 in one embodiment and include pulling the build binary from server(s) 148, replacing the appropriate binaries, making configuration changes, upgrading a database, and rebooting.

If, on the other hand, the user declines the upgrade, then at step 660 hybridity manager 132 or 134 waits for a predefined period of time (e.g., one day or any other suitable time period) before method 600 returns to step 620, where hybridity manager 132 or 134 raises another alert.

Advantageously, techniques disclosed herein provide server-initiated upgrades that are coordinated across hybrid cloud computing system sites. A virtual NOC with a holistic view of on-premise and cloud computing system environments determines compatibility of hybridity manager builds with paired hybridity manager(s) and dependent components. The virtual NOC then pushes compatible upgrade notifications to the appropriate hybridity managers. This is in contrast to isolated client-initiated upgrades, in which a user of the hybrid cloud computing system may only have visibility into, e.g., on-premise data center components, as opposed to the entire deployment topology. Further, if there is an existing incompatibility between a hybridity manager and dependent components or paired hybridity managers, then techniques disclosed herein permit the incompatible hybridity manager to be upgraded to be compatible as soon as such an upgrade is available and the virtual NOC pushes an upgrade notification indicating the same to the hybridity manager. In addition, techniques disclosed herein automatically revoke previous upgrade notifications if the upgrade versions are no longer compatible with dependent components and/or paired hybridity managers.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. Virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method, comprising:
    receiving at a computer in communication with first and second computing systems of a hybrid cloud computing system via a network, from a first hybridity manager that runs in the first computing system of the hybrid cloud computing system, information relating to a version of the first hybridity manager and versions of dependent components associated with the first hybridity manager, wherein the computer runs in a third computing system external to the hybrid cloud computing system;
    receiving, at the computer from a second hybridity manager that runs in the second computing system of the hybrid cloud computing system, information relating to a version of the second hybridity manager and versions of dependent components associated with the second hybridity manager;
    determining, by the computer, that a compatible upgrade for a build of the first hybridity manager is available based, at least in part, on the compatible upgrade being compatible with the version of the second hybridity manager and the versions of the dependent components associated with the first hybridity manager; and
    transmitting, from the computer through the network, a notification indicating availability of the compatible upgrade to the first hybridity manager.

2. The method of claim 1, wherein the compatible upgrade is further determined to be available based on the second hybridity manager being paired with the first hybridity manager through the network.

3. The method of claim 1, wherein receiving the information relating to the versions of the first hybridity manager and the dependent components comprises receiving the information, at the computer through the network, periodically.

4. The method of claim 1, further comprising, subsequent to transmitting the notification indicating the availability of the compatible upgrade:
    determining that an upgrade to a dependent component of the first hybridity manager or to the second hybridity manager paired with the first hybridity manager is incompatible with the compatible upgrade; and
    revoking the notification indicating the availability of the compatible upgrade.

5. The method of claim 1, wherein the dependent components associated with any of the first and second hybridity managers include at least one of a virtualization infrastructure manager (VIM) or a software defined network (SDN) module.

6. The method of claim 1, wherein, in response to receiving the notification, the first hybridity manager periodically generates alerts displayed on a display screen to upgrade the build of the first hybridity manager to the compatible upgrade.

7. The method of claim 6, wherein the first hybridity manager further downloads the compatible upgrade in response to a user accepting one of the displayed alerts for the compatible upgrade.

8. The method of claim 7, wherein the compatible upgrade is uploaded to, and downloaded from, a content distribution network (CDN).

9. The method of claim 1, wherein receiving the information relating to the version of the first hybridity manager and the versions of the dependent components associated with the first hybridity manager includes:
    invoking, by the first hybridity manager, application programming interfaces (APIs) provided by the dependent components associated with the first hybridity manager to collect the information relating to the versions of the dependent components associated with the first hybridity manager; and
    sending, by the first hybridity manager, the collected information relating to the versions of the dependent components associated with the first hybridity manager and the version of the first hybridity manager to the computer.

10. A non-transitory computer-readable storage medium storing instructions, which when executed by a computer, perform operations comprising:
    receiving at the computer in communication with first and second computing systems of a hybrid cloud computing system via a network, from a first hybridity manager that runs in the first computing system of the hybrid cloud computing system, information relating to a version of the first hybridity manager and versions of dependent components associated with the first hybridity manager, wherein the computer runs in a third computing system external to the hybrid cloud computing system;

receiving, at the computer from a second hybridity manager that runs in the second computing system of the hybrid cloud computing system, information relating to a version of the second hybridity manager and versions of dependent components associated with the second hybridity manager;

determining, by the computer, that a compatible upgrade for a build of the first hybridity manager is available based, at least in part, on the compatible upgrade being compatible with the version of the second hybridity manager and the versions of the dependent components associated with the first hybridity manager; and transmitting, from the computer through the network, a notification indicating availability of the compatible upgrade to the first hybridity manager.

11. The computer-readable storage medium of claim 10, wherein the compatible upgrade is further determined to be available based on the second hybridity manager being paired with the first hybridity manager through the network.

12. The computer-readable storage medium of claim 10, wherein receiving the information relating to the versions of the first hybridity manager and the dependent components comprises receiving the information, at the computer through the network, periodically.

13. The computer-readable storage medium of claim 10, the operations further comprising, subsequent to transmitting the notification indicating the availability of the compatible upgrade:

determining that an upgrade to a dependent component of the first hybridity manager or to the second hybridity manager paired with the first hybridity manager is incompatible with the compatible upgrade; and revoking the notification indicating the availability of the compatible upgrade.

14. The computer-readable storage medium of claim 10, wherein the dependent components associated with any of the first and second hybridity managers include at least one of a virtualization infrastructure manager (VIM) or a software defined network (SDN) module.

15. The computer-readable storage medium of claim 10, wherein, wherein, in response to receiving the notification, the first hybridity manager periodically generates alerts displayed on a display screen to upgrade the build of the first hybridity manager to the compatible upgrade.

16. The computer-readable storage medium of claim 15, wherein the first hybridity manager further downloads the compatible upgrade in response to a user accepting one of the displayed alerts for the compatible upgrade.

17. The computer-readable storage medium of claim 16, wherein the compatible upgrade is uploaded to, and downloaded from, a content distribution network (CDN).

18. The computer-readable storage medium of claim 10, wherein receiving the information relating to the version of the first hybridity manager and the versions of the dependent components associated with the first hybridity manager includes:

invoking, by the first hybridity manager, application programming interfaces (APIs) provided by the dependent components associated with the first hybridity manager to collect, through a second network, the information relating to the versions of the dependent components associated with the first hybridity manager; and sending, by the first hybridity manager, the collected information relating to the versions of the dependent components associated with the first hybridity manager and the version of the first hybridity manager to the computer via the network.

19. A system, comprising:

a processor; and a memory, wherein the memory includes an application program configured to perform operations comprising:

receiving at a computer in communication with first and second computing systems of a hybrid cloud computing system via a network, from a first hybridity manager that runs in the first computing system of the hybrid cloud computing system, information relating to a version of the first hybridity manager and versions of dependent components associated with the first hybridity manager, wherein the computer runs in a third computing system external to the hybrid cloud computing system;

receiving, at the computer from a second hybridity manager that runs in the second computing system of the hybrid cloud computing system, information relating to a version of the second hybridity manager and versions of dependent components associated with the second hybridity manager;

determining, by the computer, that a compatible upgrade for a build of the first hybridity manager is available based, at least in part, on the compatible upgrade being compatible with the version of the second hybridity manager and the versions of the dependent components associated with the first hybridity manager; and transmitting, from the computer through the network, a notification indicating availability of the compatible upgrade to the first hybridity manager.

20. The system of claim 19, wherein the compatible upgrade is further determined to be available based on the second hybridity manager being paired with the first hybridity manager through the network.

* * * * *